United States Patent
Miyatake et al.

(10) Patent No.: US 12,470,306 B2
(45) Date of Patent: Nov. 11, 2025

(54) OPTICAL POWER SUPPLY SYSTEM, SLEEP CONTROL METHOD AND POWER RECEIVING OPTICAL COMMUNICATION APPARATUS

(71) Applicant: NTT, Inc., Tokyo (JP)

(72) Inventors: Ryo Miyatake, Musashino (JP); Hiroaki Katsurai, Musashino (JP); Tomoaki Yoshida, Musashino (JP)

(73) Assignee: NTT, Inc., Tokyo (JP)

( * ) Notice: Subject to any disclaimer, the term of this patent is extended or adjusted under 35 U.S.C. 154(b) by 259 days.

(21) Appl. No.: 18/265,589

(22) PCT Filed: Dec. 15, 2020

(86) PCT No.: PCT/JP2020/046650
§ 371 (c)(1),
(2) Date: Jun. 6, 2023

(87) PCT Pub. No.: WO2022/130478
PCT Pub. Date: Jun. 23, 2022

(65) Prior Publication Data
US 2024/0031037 A1    Jan. 25, 2024

(51) Int. Cl.
*H04B 10/80* (2013.01)
*H04B 10/2575* (2013.01)

(52) U.S. Cl.
CPC ....... *H04B 10/807* (2013.01); *H04B 10/2575* (2013.01)

(58) Field of Classification Search
CPC ........................... H04B 10/806; H04B 10/807
(Continued)

(56) References Cited

U.S. PATENT DOCUMENTS

2009/0238559 A1 *   9/2009   Pfeiffer ............... H04B 10/272
                                                                            398/58
2013/0242201 A1     9/2013   Deguchi et al.
(Continued)

FOREIGN PATENT DOCUMENTS

JP    2010193374    9/2010
JP    2013197843    9/2013
(Continued)

*Primary Examiner* — Li Liu
(74) *Attorney, Agent, or Firm* — Fish & Richardson P.C.

(57) ABSTRACT

An optical power supply system, comprising: a power supply optical communication device that supplies power using an optical signal for power supply; and a power receiving optical communication device that is driven by power obtained from the optical signal for power supply transmitted from the power supply optical communication device, wherein the power supply optical communication device includes an optical power supply unit that transmits the optical signal for power supply to the power receiving optical communication device, when there is data to be transmitted to the power receiving optical communication device, transmit a sleep control signal having a shape corresponding to the time length of the data or having a shape with high noise resistance, to cancel a sleep state of a part of function units of the power receiving optical communication device, to the power receiving optical communication device, and the power receiving optical communication device includes a signal detection unit that detects the sleep control signal transmitted from the power supply optical communication device, and a sleep control unit that controls a functional unit in a sleep state to an active state according to the sleep control signal detected by the signal detection unit.

15 Claims, 12 Drawing Sheets

(58) Field of Classification Search
USPC .......................................................... 398/171
See application file for complete search history.

(56) References Cited

U.S. PATENT DOCUMENTS

| | | | | |
|---|---|---|---|---|
| 2018/0359032 A1* | 12/2018 | Sone | ................ | H04B 10/25752 |
| 2019/0123845 A1* | 4/2019 | Taguchi | ................ | H04B 10/27 |
| 2021/0036785 A1* | 2/2021 | Sugime | ................ | H04B 10/25 |

FOREIGN PATENT DOCUMENTS

| | | | |
|---|---|---|---|
| JP | 201798643 | | 6/2017 |
| JP | 2017098643 A | * | 6/2017 |
| JP | 2018207457 | | 12/2018 |

* cited by examiner

Fig. 2

| WAVEFORM PATTERN | SLEEP CANCELLATION TIME (MILLISECOND) |
|---|---|
| A | X |
| B | Y |
| C | Z |
| ⋮ | ⋮ |

OPTICAL POWER SUPPLY SYSTEM, SLEEP CONTROL METHOD AND POWER RECEIVING OPTICAL COMMUNICATION APPARATUS

CROSS-REFERENCE TO RELATED APPLICATIONS

This application is a National Stage application under 35 U.S.C. § 371 of International Application No. PCT/JP2020/046650, having an International Filing Date of Dec. 15, 2020.

The disclosure of the prior application is considered part of the disclosure of this application, and is incorporated by reference in its entirety into this application.

TECHNICAL FIELD

The present invention relates to an optical power supply system, a sleep control method, and a power receiving optical communication device.

BACKGROUND ART

Conventionally, an optical power supply system disclosed in PTL 1 has been proposed. In the optical power supply system disclosed in PTL 1, an optical signal for power supply (hereinafter referred to as "power supply light") is transmitted from an OLT (Optical Line Terminal) is received by an ONU (Optical Network Unit: subscriber line terminating device), and power is supplied from the OLT. In the optical power supply system shown in PTL 1, the same wavelength is used for the optical signal used for power supply and the optical signal for communication, thereby eliminating the need for expensive optical multiplexer and optical demultiplexer used for separating wavelengths for power supply and communication. Thereby, the construction cost of the optical power supply system can be suppressed.

CITATION LIST

Patent Literature

[PTL 1] Japanese Patent Application Laid-open No. 2010-193374

SUMMARY OF INVENTION

Technical Problem

As described above, in the ONU which is supplied with power by power supply, a part of the functions is set in the sleep state when the ONU is not used in order to reduce the consumption of the supplied power. In the configuration shown in PTL 1, the operation is controlled by periodically generating an operation trigger by using a timer. In the ONU in a sleep state, in order to receive downlink data, at least the sleep of the receiving unit must be cancelled at a timing when the downlink data comes. In a configuration in which sleep is periodically cancelled, time synchronization is required between an OLT and an ONU, and wasteful start-up and standby power are generated. Such a problem is not limited to the ONU, but is common to all the power receiving optical communication devices driven by power obtained from the optical signal for power supply.

In view of the foregoing circumstances, an objective of the present invention is to provide a technology capable of reducing the power consumption of a power receiving optical communication device that is driven by power obtained by power supply.

Solution to Problem

An aspect of the present invention is an optical power supply system including: a power supply optical communication device that supplies power using an optical signal for power supply; and a power receiving optical communication device that is driven by power obtained from the optical signal for power supply transmitted from the power supply optical communication device, wherein the power supply optical communication device includes an optical power supply unit that transmits the optical signal for power supply to the power receiving optical communication device, when there is data to be transmitted to the power receiving optical communication device, transmit a sleep control signal having a shape corresponding to the time length of the data or having a shape with high noise resistance, to cancel a sleep state of a part of function units of the power receiving optical communication device, to the power receiving optical communication device, and the power receiving optical communication device includes a signal detection unit that detects the sleep control signal transmitted from the power supply optical communication device, and a sleep control unit that controls a functional unit in a sleep state to an active state according to the sleep control signal detected by the signal detection unit.

An aspect of the present invention is a sleep control method including: a power supply optical communication device that supplies power using an optical signal for power supply; and a power receiving optical communication device that is driven by power obtained from the optical signal for power supply transmitted from the power supply optical communication device, wherein the power supply optical communication device includes an optical power supply unit that transmits the optical signal for power supply to the power receiving optical communication device, when there is data to be transmitted to the power receiving optical communication device, transmit a sleep control signal having a shape corresponding to the time length of the data or having a shape with high noise resistance, to cancel a sleep state of a part of function units of the power receiving optical communication device, to the power receiving optical communication device, and the power receiving optical communication device includes a signal detection unit that detects the sleep control signal transmitted from the power supply optical communication device, and a sleep control unit that controls a functional unit in a sleep state to an active state according to the sleep control signal detected by the signal detection unit.

A power receiving optical communication device, in an optical power supply system that includes a power supply optical communication device that supplies power using an optical signal for power supply, and a power receiving optical communication device that is driven by power obtained from the optical signal for power supply transmitted from the power supply optical communication device, a power receiving optical communication device including: a signal detection unit, having a shape corresponding to the time length of the data or having a shape with high noise resistance, and canceling a sleep state of a part of function units of the power receiving optical communication device, for detecting a sleep control signal to cancel a sleep state of a part of function units; and a sleep control unit that controls a functional unit in a sleep state to an active state depending on the sleep control signal detected by the signal detection unit.

Advantageous Effects of Invention

According to the present invention, it is possible to reduce power consumption of a power receiving optical communication device that is driven by power obtained by power supply as a power source.

BRIEF DESCRIPTION OF DRAWINGS

FIG. 2 is a diagram illustrating an example of information stored in a sleep control information storage unit.

DESCRIPTION OF EMBODIMENTS

The following describes an embodiment of the present invention with reference to the drawings.
(Overview)

First, an overview of an optical power supply system according to the present invention will be described.

In an optical communication system for performing optical power supply, when a power supply optical communication device has data to transmit to a power receiving optical communication device (hereinafter referred to as "transmission data"), the power supply optical communication device transmits the sleep control signal having a shape triggering of a sleep cancellation, and cancelling the sleep state of some functional units of the power receiving optical communication device, to the receiving optical communication device via a line that transmits the power supply light (hereinafter referred to as "power supply line"). Here, the shape to be a trigger for sleep cancellation is, for example, a shape corresponding to the time length of data or a shape having high noise resistance. The power receiving optical communication device detects a sleep control signal transmitted from the power supply optical communication device, and controls the function unit in the sleep state to the active state according to the detected sleep control signal.

According to the above-described configuration, the power receiving optical communication device only needs to cancel the sleep only when the sleep control signal is detected, and it is not necessary to periodically cancel the sleep.

Therefore, power consumption can be reduced.

A specific configuration will be described below by taking a plurality of embodiments as examples.

First Embodiment

Figure 1:
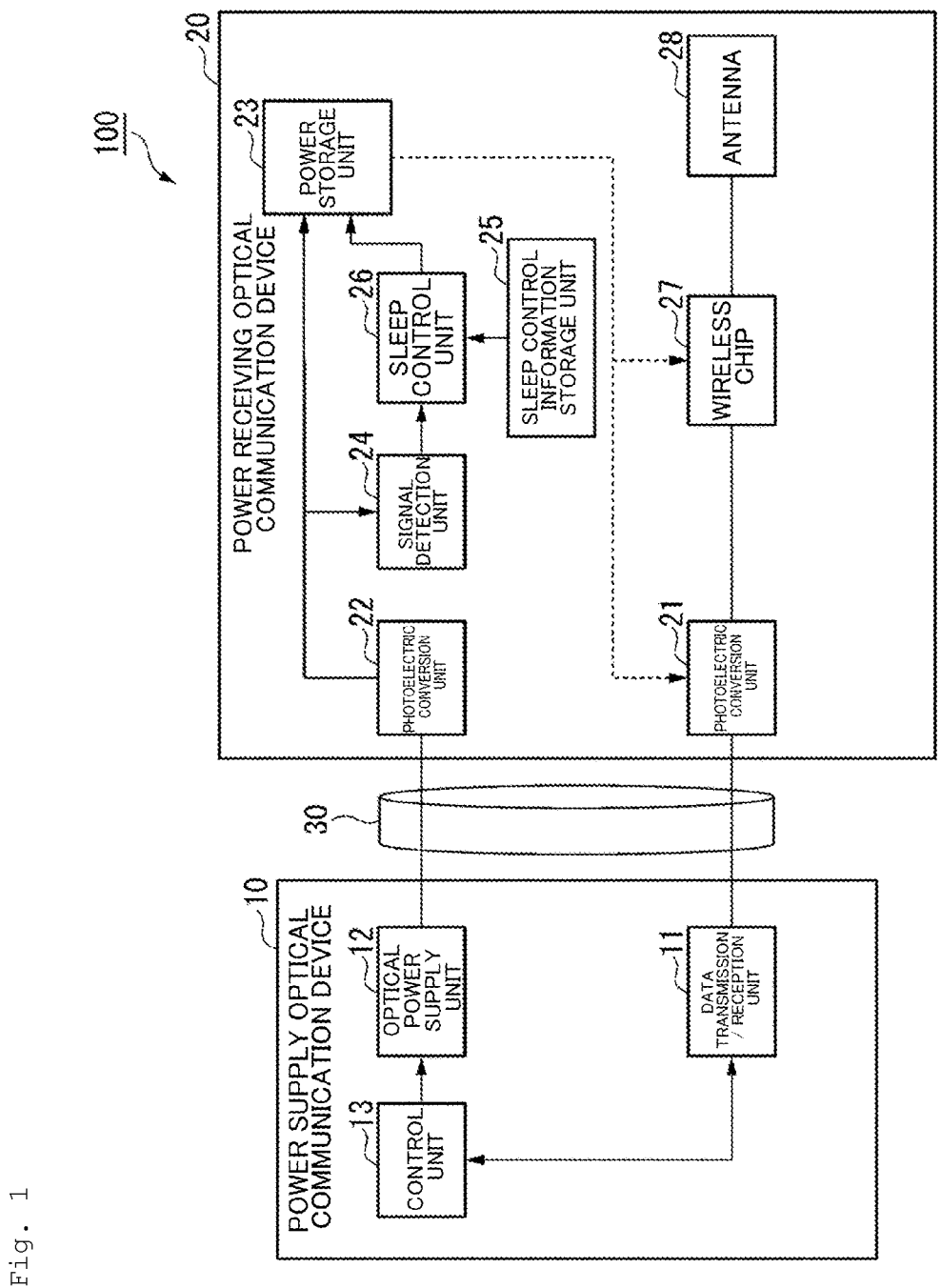
FIG. 1 is a diagram illustrating an exemplary configuration of an optical power supply system according to a first embodiment.

FIG. 1 is a diagram showing a configuration example of an optical power supply system 100 according to the first embodiment.

The optical power supply system 100 includes a power supply optical communication device 10 and a power receiving optical communication device 20. The power supply optical communication device 10 and the power receiving optical communication device 20 are connected via an optical transmission line 30. By connecting the power supply optical communication device 10 and the power receiving optical communication device 20 via the optical transmission line 30, communication between the power supply optical communication device 10 and the power receiving optical communication device 20 becomes possible. For example, the power supply optical communication device 10 and the power receiving optical communication device 20 are connected via a power supply line and a communication line, respectively.

The power supply line and the communication line may be physically provided in the same fiber or may be provided in separate independent fibers, respectively. That is, the same fiber may be physically shared between the optical signal for communication and the optical signal for power supply, or another independent fiber may be used. In the case where the same fiber is shared between the optical signal for communication and the optical signal for power supply, there is a method of wavelength multiplexing the light for communication and the light for power supply by using different frequency bands. In the following description, a configuration in which an independent fiber is used as an optical signal for communication and an optical signal for power supply will be described as an example. In FIG. 1, the power supply optical communication device 10 and the power receiving optical communication device 20 have a single-star topology configuration. Hereinafter, a direction from the power supply optical communication device 10 to the power receiving optical communication device 20 is defined as a downward direction, and a direction from the power receiving optical communication device 20 to the power supply optical communication device 10 is defined as an upward direction.

Although FIG. 1 shows one power receiving optical communication device 20, the optical power supply system 100 may include a plurality of power receiving optical communication devices 20. When a plurality of power receiving optical communication devices 20 are provided in the optical power supply system 100, an optical splitter is provided between the power supply optical communication device 10 and the plurality of power receiving optical communication devices 20. The optical splitter branches the optical signal transmitted from the power supply optical communication device 10 and transmits it to each power receiving optical communication device 20. The optical splitter multiplexes the optical signals transmitted from each power receiving optical communication device 20 and transmits the multiplexed optical signals to the power supply optical communication device 10.

The power supply optical communication device 10 is, for example, an OLT. The power supply optical communication device 10 includes a data transmission/reception unit 11, an optical power supply unit 12, and a control unit 13.

The data transmission/reception unit 11 performs transmission and reception of data with the power receiving optical communication device 20. The data transmission/reception unit 11 is, for example, an optical transceiver, and includes a light source for emitting light of a specific wavelength. When there is transmission data, the data transmission/reception unit 11 modulates light emitted from an internal light source based on an electrical signal of transmission data given from the control unit 13, thereby converting an optical signal of transmission data (hereinafter referred to as "communication light", and transmits the converted communication light to the optical transmission line 30.

The data transmission/reception unit 11 includes, for example, an O/E (Optical/Electrical) converter such as a photodetector. The data transmission/reception unit 11 receives an optical signal of data received via the optical transmission line 30, converts the received optical signal of data into an electric signal by an O/E converter, and outputs the electric signal to the control unit 13.

The optical power supply unit 12 includes a light source for emitting power supply light inside, and generates power supply light by the light source and transmits it to the optical transmission line 30. Thus, the optical power supply unit 12 transmits the power supply light to the power receiving optical communication device 20. As the power supply light, for example, an optical signal having a constant voltage and no temporal change is used. When there is transmission data, the optical power supply unit 12 transmits a sleep control signal to the power receiving optical communication device 20 according to the control of the control unit 13. The sleep control signal is a signal for releasing a sleep state of a part of function units included in the power receiving optical communication device 20. The sleep control signal has a shape to trigger sleep cancellation.

In the first embodiment, the optical power supply unit 12 transmits a sleep control signal having a shape corresponding to a time length of transmission data to 20 as a sleep control signal having a shape serving as a trigger for sleep cancellation. That is, in the first embodiment, the shape of the sleep control signal differs depending on the time length of the transmission data. It is assumed that the shape of the sleep control signal generated in accordance with the time length of the transmission data has a plurality of waveform patterns defined in advance between the power supply optical communication device 10 and the power receiving optical communication device 20.

The control unit 13 controls operations of the data transmission/reception unit 11 and the optical power supply unit 12. For example, when there is no transmission data, the control unit 13 causes the optical power supply unit 12 to output power supply light. When there is transmission data, the control unit 13 fetches the transmission data from the outside. The control unit 13 generates data of an electric signal from the fetched transmission data. The control unit 13 extracts the time length of the transmission data by using the electric signal of the generated transmission data. The control unit 13 controls the optical power supply unit 12 so as to transmit a sleep control signal corresponding to the time length of the extracted transmission data.

The control unit 13 outputs data of the generated electric signal to the data transmission/reception unit 11 after transmitting the sleep control signal. A control unit 13 fetches the data of the electric signal outputted from the data transmission/reception unit 11 and outputs the fetched data to the outside.

The power receiving optical communication device 20 is driven by power supplied from the power supply optical communication device 10. The power receiving optical communication device 20 is, for example, an ONU. The power receiving optical communication device 20 includes a photoelectric conversion unit 21, a photoelectric conversion unit 22, a power storage unit 23, a signal detection unit 24, a sleep control information storage unit 25, a sleep control unit 26, a wireless chip 27, and an antenna 28. The photoelectric conversion unit 21 and the wireless chip 27 are in a sleep state when they are not used.

The photoelectric conversion unit 21 receives the optical signal transmitted from the data transmission/reception unit 11 via an optical transmission line 30, converts the received optical signal into an electric signal, and outputs the electric signal to a wireless chip 27. The photoelectric conversion unit 21 is, for example, an O/E converter such as a photodetector. The photoelectric conversion unit 21 is one mode of a function unit for processing an optical signal.

The photoelectric conversion unit 22 receives the optical signal transmitted from the optical power supply unit 12 via the optical transmission line 30, converts the received optical signal into an electric signal, and outputs the electric signal to the power storage unit 23 and the signal detection unit 24. The photoelectric conversion unit 22 is, for example, an O/E converter such as a photodetector.

The power storage unit 23 includes a battery therein. The power storage unit 23 stores power of an electric signal in a battery by performing charging processing on the basis of the electric signal output from the photoelectric conversion unit 22. The power storage unit 23 supplies a power supply voltage generated by using stored power to the photoelectric conversion unit 21 and the wireless chip 27 in response to an instruction from the sleep control unit 26. Thus, the photoelectric conversion unit 21 and the wireless chip 27 are brought into an operable state from a sleep state.

A signal detection unit 24 always monitors the electric signal converted by the photoelectric conversion unit 21 and detects a sleep control signal. Specifically, the signal detection unit 24 detects the sleep control signal when a temporal change in the waveform of the electric signal is equal to or more than a threshold. The temporal change may be a fluctuation in amplitude. Since the power supply light transmitted from the power supply optical communication device 10 uses an optical signal that has a constant voltage and does not change over time, the change over time rarely exceeds the threshold. On the other hand, since the sleep control signal is changed by modulation, it is conceivable that the temporal change in the signal waveform is greater than or equal to the threshold. When detecting the sleep control signal, the signal detection unit 24 outputs the detected sleep control signal to the sleep control unit 26. Hereinafter, it is described that the temporal change in the waveform of the electric signal is equal to or greater than a threshold value as detected with the temporal change, and it is described that the temporal change in the waveform of the electric signal is less than the threshold value as not detected with the temporal change.

A sleep control information storage unit 25 stores information in which a waveform pattern of a sleep control signal and a sleep cancellation time are associated with each other. The sleep control information storage unit 25 may store information in which, for example, a waveform pattern of the sleep control signal and the sleep cancellation time are associated with each other in a table format as shown in FIG. 2.

FIG. 2 shows an example of the information stored by the sleep control information storage unit 25.

In the table shown in FIG. 2, the waveform pattern of the sleep control signal and the sleep cancellation time are associated with each other. The waveform pattern of the sleep control signal represents the shape of the waveform of the sleep control signal. The sleep cancellation time represents a time for releasing sleep. The example shown in FIG. 2 indicates that sleep is canceled for "X+α" milliseconds when the waveform pattern is "A". Here, α is a time for absorbing a transmission delay between the power supply optical communication device 10 and the power receiving optical communication device 20, or a timing deviation caused by signal processing occurring. As an example of the method of determining the α, a method of measuring in advance a transmission delay between the power supply optical communication device 10 and the power receiving optical communication device 20, or a timing deviation caused by signal processing occurring, and using the value as a constant α, or the like can be considered. It is not necessary to register the value of "α" for the sleep cancellation time of the table shown in FIG. 2. In this case, when the sleep control unit 26 cancels the sleep, the time obtained by adding the time α for absorbing the timing deviation to the sleep cancellation time obtained from the table may be set as the sleep cancellation time.

Description will continue by referring back to FIG. 1.

A sleep control unit 26 refers to the information stored in the sleep control information storage unit 25, and controls the function unit in the sleep state to the active state according to the sleep control signal detected by the signal detection unit 24. Specifically, the sleep control unit 26 controls the function unit in the sleep state to the active state for at least a time specified by the shape of the sleep control signal.

When the transmission speed is the same in the optical communication section between the power supply optical communication device 10 and the power receiving optical communication device 20 and the wireless communication section between the power receiving optical communication device 20 and an external wireless device (not shown), at the same timing, the sleep control unit 26 performs sleep control of the functional unit that processes the optical signal (the photoelectric conversion unit 21 in the example shown in FIG. 1) and the functional unit that processes the electrical signal (the wireless chip 27 in the example shown in FIG. 1). An optical communication section between the power supply optical communication device 10 and the power receiving optical communication device 20 is a section between the data transmission/reception unit 11 and the photoelectric conversion unit 21. The wireless communication section between the power receiving optical communication device 20 and an external wireless device (not shown) is a section between the output of the photoelectric conversion unit 21 and the antenna 28. In the first embodiment, it is assumed that the transmission speed is the same in an optical communication section between the power supply optical communication device 10 and the power receiving optical communication device 20 and in a wireless communication section between the power receiving optical communication device 20 and an external wireless device (not shown).

The wireless chip 27 is a functional unit operable by power supplied from the power storage unit 23. Therefore, the wireless chip 27 is in a sleep state when power is not supplied from the power storage unit 23. The wireless chip 27 is switched from a sleep state to an active state when power is supplied from the power storage unit 23. The wireless chip 27 communicates with an external wireless device by radio via an antenna 28.

The wireless chip 27 includes a function unit for communicating with an external wireless device. For example, the wireless chip 27 includes a modem, oscillator, mixer, level detector, preamble detector, and the like as functional units for communicating with an external wireless device. The wireless chip 27 is one mode of a function unit for processing an electric signal.

When the wireless chip 27 connects to an external wireless device by wireless communication means, for example, a Wi-Fi module (Wi-Fi is a registered trademark) or the like is applied as the wireless chip 27. The wireless chip 27 receives data transmitted by an external wireless device at a predetermined fixed cycle, and writes the received data in a storage unit (not shown) to store the data. The wireless chip 27 fetches the data outputted from the photoelectric conversion unit 21 and transmits the fetched data to an external wireless device. When a storage unit (not shown) stores data to be transmitted to an external wireless device, the wireless chip 27 reads the data from the storage unit and transmits the read data to the external wireless device.

The external wireless device is, for example, a sensor node such as an IoT (Internet of Things) sensor. The external wireless device is connected to the power receiving optical communication device 20 by radio. The external wireless device transmits, for example, data measured by a sensor provided inside to the power receiving optical communication device 20 at a predetermined constant cycle. An external wireless device receives data transmitted by the power receiving optical communication device 20. A plurality of external wireless devices may exist, and in this case, the plurality of external wireless devices wirelessly connects to the power receiving optical communication device 20.

FIG. 2 is a flowchart showing the flow of processing of the power supply optical communication device 10 in the first embodiment.

The control unit 13 of the power supply optical communication device 10 determines whether or not there is transmission data (step S101). For example, the control unit 13 determines that there is transmission data when the transmission data is fetched from the outside or the transmission data is present in an internal storage unit. On the other hand, the control unit 13 determines that there is no transmission data when the transmission data is not fetched from the outside and when there is no transmission data in the internal storage unit.

If there is no transmission data (step S101—NO), the control unit 13 of the power supply optical communication device 10 controls the optical power supply unit 12 to transmit the power supply light. The optical power supply unit 12 generates power supply light by a light source provided inside and sends it out to the optical transmission line 30 (step S102). After that, the process returns to step S101.

If there is transmission data (step S101—YES), the control unit 13 confirms the time length of the transmission data (step S103).

The control unit 13 controls the optical power supply unit 12 to generate a sleep control signal according to the time length of the transmission data. The optical power supply unit 12 generates a sleep control signal according to the time length of the transmission data according to the control of the control unit 13 (step S104).

A method of generating a sleep control signal in the first embodiment will be described.

Figure 4:
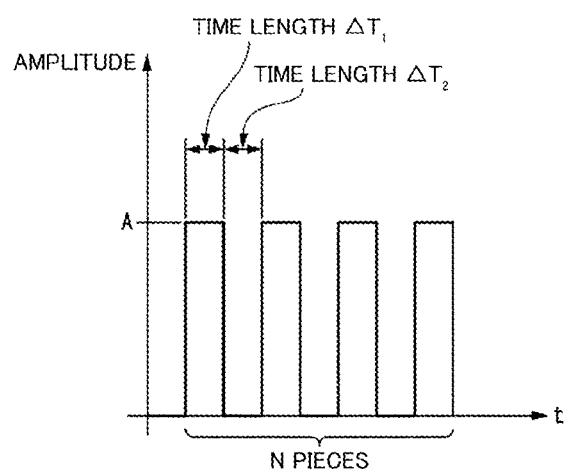
FIG. 4 is a diagram for describing first generation method of sleep control signal in the first embodiment.

First, FIG. 4 is used to explain the first method of generating the sleep control signal in the first embodiment. As shown in FIG. 4, it is assumed that an on/off signal is transmitted as a waveform of the sleep control signal. The optical power supply unit 12 generates a signal whose amplitude A, ON/OFF count N (N is an integer equal to or greater than 1), ON time length $\Delta t_1$, and OFF time length $\Delta t_2$ are proportional to the time length of the transmission data. The optical power supply unit 12 generates a sleep control signal by modulating light emitted from the light source by using the generated signal.

Figure 5:
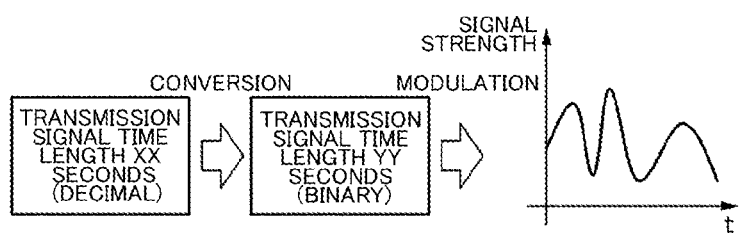
FIG. 5 is a diagram for describing second generation method of sleep control signal in the first embodiment.

Next, a second method of generating the sleep control signal according to the first embodiment will be described with reference to FIG. 5. As shown in FIG. 5, the optical power supply unit 12 first converts the time length information of the transmission data into a binary number (0/1) signal. Then, the optical power supply unit 12 uses a method of transmitting the binary number as an ON/OFF signal, or a method of transmitting after converting binary number by generally known modulation method (BPSK (Binary Phase Shift Keying), 16QAM (Quadrature Amplitude Modulation), and the like). The optical power supply unit 12 generates a sleep control signal by modulating light emitted from the light source by using the converted binary on/off signal or the signal after modulating the binary.

The optical power supply unit 12 transmits the generated sleep control signal to the power receiving optical communication device 20 (step S105). Specifically, the optical power supply unit 12 transmits a sleep control signal to the power receiving optical communication device 20 via a power supply line. After the sleep control signal is transmitted, the control unit 13 controls the data transmission/reception unit 11 to transmit transmission data. The control unit 13 outputs data of an electric signal generated from the transmission data to the data transmission/reception unit 11.

The data transmission/reception unit 11 generates communication light on the basis of the electric signal of the transmission data output from the control unit 13. The data transmission/reception unit 11 outputs the generated communication light to the optical transmission line 30 (step S106). After that, the process returns to step S101.

Figure 6:
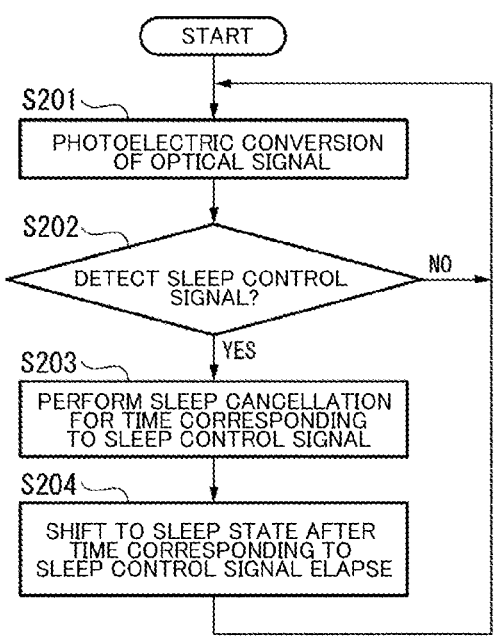
FIG. 6 is a flowchart illustrating a flow of processing of a power receiving optical communication device according to the first embodiment.

FIG. 6 is a flowchart showing the processing flow of the power receiving optical communication device 20 in the first embodiment. In the flowchart shown in FIG. 6, the processing of the optical signal received by the photoelectric conversion unit 22 will be mainly described.

The photoelectric conversion unit 22 of the power receiving optical communication device 20 converts the optical signal received via the power supply line into an electric signal and outputs the electric signal to the power storage unit 23 and the signal detection unit 24 (step S201). The power storage unit 23 performs charging processing on the basis of the electric signal output from the photoelectric conversion unit 22. A signal detection unit 24 always monitors the electric signals outputted from the photoelectric conversion unit 22. In this way, the power receiving optical communication device 20 monitors electrical signals while constantly charging the battery. The signal detection unit 24 determines whether or not a sleep control signal has been detected (step S202).

When detecting a temporal change in the waveform of the electrical signal output from the photoelectric conversion unit 22, the signal detection unit 24 determines that the sleep control signal has been detected. When no temporal change is detected in the waveform of the electrical signal output from the photoelectric conversion unit 22, the signal detection unit 24 determines that the sleep control signal has not been detected. If the signal detection unit 24 has not detected the sleep control signal (step S202—NO), the signal detection unit 24 does not perform any particular processing. After that, the process returns to step S201.

When the signal detection unit 24 detects the sleep control signal (step S202—YES), the signal detection unit 24 outputs a notification indicating that the sleep control signal has been detected and the detected sleep control signal to the sleep control unit 26. The sleep control unit 26 refers to the information stored in the sleep control information storage unit 25, and acquires information on sleep cancellation time corresponding to the sleep control signal output from the signal detection unit 24. For example, the sleep control unit 26 collates the shape indicated by the waveform pattern stored in the sleep control information storage unit 25 with the shape of the waveform of the sleep control signal output from the signal detection unit 24. Then, the sleep control unit 26 acquires information on sleep cancellation time associated with a waveform pattern matching the shape of the waveform of the sleep control signal output from the signal detection unit 24.

The sleep control unit 26 controls the power storage unit 23 to supply power during the acquired sleep cancellation time. Under the control of the sleep control unit 26, the power storage unit 23 supplies power to the photoelectric conversion unit 21 and the wireless chip 27 for the specified sleep cancellation time, thereby canceling the sleep of the photoelectric conversion unit 21 and the wireless chip 27 (step S203).

When power is supplied from the power storage unit 23, the photoelectric conversion unit 21 and the wireless chip 27 are started from a sleep state. After transmission of the sleep control signal, communication light is transmitted from the power supply optical communication device 10. Therefore, the photoelectric conversion unit 21 receives the communication light transmitted from the power supply optical communication device 10 via a communication line. The photoelectric conversion unit 21 converts the received communication light into an electrical signal of transmission data. The photoelectric conversion unit 21 outputs an electric signal of the transmission data to a wireless chip 27. The wireless chip 27 up-converts the input electric signal and transmits it to an external wireless device as a radio signal.

The sleep control unit 26 controls the power storage unit 23 to stop power supply to the photoelectric conversion unit 21 and the wireless chip 27 after the lapse of the sleep cancellation time. The power storage unit 23 stops supply of power to the photoelectric conversion unit 21 and the wireless chip 27 according to control of the sleep control unit 26, thereby shifting the photoelectric conversion unit 21 and the wireless chip 27 to a sleep state (step S204). When the supply of power from the power storage unit 23 is stopped, the photoelectric conversion unit 21 and the wireless chip 27 are shifted from an active state to a sleep state. After that, the processes after step S201 are executed.

According to the optical power supply system 100 configured as described above, the power supply optical communication device 10 has a shape to trigger sleep cancellation when there is data to be transmitted to the power receiving optical communication device 20, and transmits to the power receiving optical communication device 20 sleep control signal for releasing the sleep state of a part of the function units included in the power receiving optical communication device 20. The power receiving optical communication device 20 detects a sleep control signal to be transmitted, and controls a function unit in a sleep state to an active state according to the detected sleep control signal. Thus, the power receiving optical communication device 20 only needs to cancel the sleep of the function unit in the sleep state only when the sleep control signal is detected, and it is not necessary to periodically cancel the sleep. Therefore, the power consumption of the power receiving optical communication device 20 can be reduced.

The power supply optical communication device 10 transmits a sleep control signal having a shape corresponding to the time length of the transmission data as a shape to be a trigger of sleep cancellation to the power receiving optical communication device 20. The power receiving optical communication device 20 controls the function unit in the sleep state to the active state by at least a time specified by the shape of the sleep control signal. Thus, by devising the waveform of the sleep control signal, the power receiving optical communication device 20 can easily grasp the sleep cancellation time by the waveform pattern of the sleep control signal. Therefore, the sleep cancellation time can be notified by a simple method.

The following describes a variation of the optical power supply system 100 in the first embodiment.

The power supply optical communication device 10 may be configured to repeatedly transmit the sleep control signal generated by the methods shown in FIGS. 4 and 5. That is, the power supply optical communication device 10 may be configured to continuously transmit the same sleep control signal to the power receiving optical communication device 20. In such a configuration, the optical power supply unit 12 generates a sleep control signal a plurality of times according to the control of the control unit 13, and continuously transmits the generated sleep control signal to the power receiving optical communication device 20. The signal detection unit 24 of the power receiving optical communication device 20 detects the received signal as a sleep control signal when the signal detection unit 24 detects a temporal change in the waveform of the electrical signal and, the same waveform a plurality of times (for example, a predetermined number of times).

With this configuration, it is possible to reduce the probability of erroneous determination of sleep control signal detection in the power receiving optical communication device 20.

Second Embodiment

It is conceivable that sleep cancellation may be erroneously performed due to erroneous detection of the sleep control signal. If the sleep cancellation is performed by mistake, wasteful power is consumed. Therefore, in the second embodiment, a configuration will be described in which a power supply optical communication device reduces erroneous detection of a sleep control signal by transmitting a sleep control signal having a shape with high noise resistance.

Figure 7:
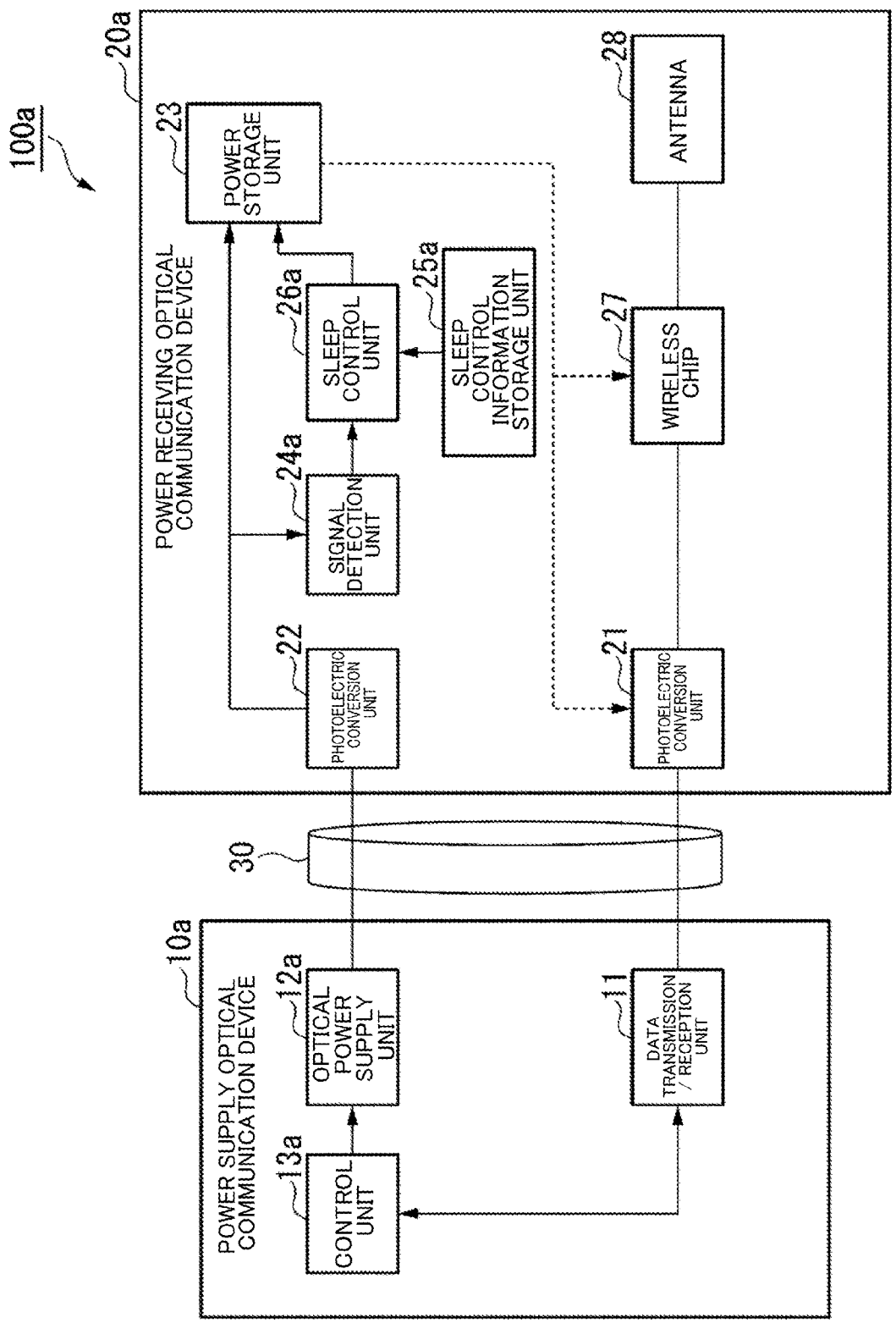
FIG. 7 is a diagram illustrating a configuration example of an optical power supply system according to a second embodiment.

FIG. 7 is a diagram showing a configuration example of an optical power supply system 100*a* according to the second embodiment.

The optical power supply system 100*a* includes a power supply optical communication device 10*a* and a power receiving optical communication device 20*a*. The power supply optical communication device 10*a* and the power receiving optical communication device 20*a* are connected via an optical transmission line 30. The power supply optical communication device 10*a* and the power receiving optical communication device 20*a* are connected via the optical transmission line 30, thereby enabling communication between the power supply optical communication device 10*a* and the power receiving optical communication device 20*a*. For example, the power supply optical communication device 10*a* and the power receiving optical communication device 20*a* are connected via a power supply line and a communication line, respectively. In FIG. 7, the power supply optical communication device 10 and the power receiving optical communication device 20*a* have a single star type topology configuration.

Although one power receiving optical communication device 20*a* is shown in FIG. 7, the optical power supply system 100*a* may include a plurality of power receiving optical communication devices 20*a*. When the optical power supply system 100*a* is provided with a plurality of power receiving optical communication devices 20*a*, an optical splitter is provided between the power supply optical communication device 10*a* and the plurality of power receiving optical communication devices 20*a*. The optical splitter branches the optical signal transmitted from the power supply optical communication device 10*a* and transmits it to each power receiving optical communication device 20*a*. The optical splitter multiplexes the optical signals transmitted from each power receiving optical communication device 20*a* and transmits the multiplexed optical signals to the power supply optical communication device 10*a*.

In the second embodiment, as the sleep control signal, the power supply optical communication device 10*a* uses a signal having a shape with high noise resistance. It is desirable to have a signal pattern with a low probability of erroneous determination as a signal having a shape with high noise resistance. For example, as a signal pattern in which the probability of erroneous determination becomes low, M-sequence known because of high autocorrelation, repetition of the same waveform, and a method using an error correction code can be considered. When transmission data are generated, the power supply optical communication device 10*a* transmits a sleep control signal to the power receiving optical communication device 20*a* via the power supply line. Then, the power supply optical communication device 10*a* transmits communication light to the power receiving optical communication device 20*a* via the communication line after transmitting the sleep control signal.

The power receiving optical communication device 20*a* converts the optical signal received via the power supply line into an electric signal and monitors the electric signal. The power receiving optical communication device 20*a* cancels sleep for a fixed time when detecting the sleep control signal. Herein below, a specific configuration will be described.

The power supply optical communication device 10*a* includes a data transmission/reception unit 11, an optical power supply unit 12*a*, and a control unit 13*a*.

The power supply optical communication device 10*a* has a different configuration from the power supply optical communication device 10 in that the optical power supply unit 12*a* and the control unit 13*a* are included instead of the optical power supply unit 12 and the control unit 13. The power supply optical communication device 10*a* is similar to the power supply optical communication device 10 in other configurations. Therefore, the description of the entire power supply optical communication device 10*a* is omitted, and the optical power supply unit 12*a* and the control unit 13*a* are described.

The optical power supply unit 12*a* is provided with a light source for emitting power supply light inside, and generates power supply light by the light source and transmits it to the optical transmission line 30. Thus, the optical power supply unit 12*a* transmits the power supply light to the power receiving optical communication device 20*a*. When there is transmission data, the optical power supply unit 12*a* transmits a sleep control signal to the power receiving optical communication device 20*a* according to the control of the control unit 13*a*.

In a second embodiment, the optical power supply unit 12*a* transmits a sleep control signal having a shape with high noise resistance to 20 as a sleep control signal having a shape to be a trigger of sleep cancellation. In the second embodiment, the same sleep control signal is used regardless of the time length of the transmission data. It is assumed that the shape of the sleep control signal is predetermined between the power supply optical communication device 10 and the power receiving optical communication device 20.

A control unit 13*a* controls the operation of the data transmission/reception unit 11 and the optical power supply unit 12*a*. For example, the control unit 13*a* outputs the power supply light from the optical power supply unit 12*a* when there is no transmission data. The control unit 13*a* controls the optical power supply unit 12*a* so as to transmit a sleep control signal when there is transmission data. The control unit 13*a* outputs data of the generated electric signal to a data transmission/reception unit 11 after transmitting the sleep control signal. A control unit 13*a* fetches the data of the electric signal outputted by the data transmission/reception unit 11 and outputs the fetched data to the outside.

The power receiving optical communication device 20*a* is driven by power supplied from the power supply optical communication device 10*a*. The power receiving optical communication device 20*a* includes a photoelectric conversion unit 21, a photoelectric conversion unit 22, a power storage unit 23, a signal detection unit 24*a*, A sleep control unit 26*a*, a wireless chip 27, and an antenna 28 are provided. Note that the photoelectric conversion unit 21 and the wireless chip 27 are in a sleep state when not in use.

The power receiving optical communication device 20*a* is different in configuration from the power receiving optical communication device 20 in that the power receiving optical communication device 20*a* includes a signal detection unit 24*a* and a sleep control unit 26*a* instead of the signal detection unit 24 and the sleep control unit 26, and in that the power receiving optical communication device 20*a* does not include a sleep control information storage unit 25. The power receiving optical communication device 20*a* is similar to the power receiving optical communication device 20 about other configurations. Therefore, the description of the entire power receiving optical communication device 20*a* is omitted, and the signal detection unit 24*a* and the sleep control unit 26*a* are described.

A signal detection unit 24*a* always monitors the electric signal converted by the photoelectric conversion unit 21 and detects a sleep control signal. Specifically, when the power supply optical communication device 10*a* uses an M-sequence signal as a sleep control signal, the signal detection unit 24*a* calculates autocorrelation and detects the sleep control signal when the correlation exceeds a threshold. When the power supply optical communication device 10*a* repeatedly transmits the same waveform as the sleep control signal, the signal detection unit 24*a* detects the sleep control signal with the detection of the same waveform a plurality of times (for example, a predetermined number of times) as a trigger.

When the power supply optical communication device 10*a* uses an error correction code as a sleep control signal, a signal detection unit 24*a* detects the sleep control signal with a timing that a temporal change in a signal after decoding the code is equal to or more than a threshold. It is assumed that whether the power supply optical communication device 10*a* uses the M-sequence signal as a sleep control signal, whether the repetition of the same waveform is used as a sleep control signal, or whether the error correction code is used as a sleep control signal is determined between the power supply optical communication device 10*a* and the power receiving optical communication device 20*a* before processing. The signal detection unit 24*a* outputs the detected sleep control signal to the sleep control unit 26*a* when detecting the sleep control signal.

When the signal detection unit 24*a* detects the sleep control signal, the sleep control unit 26*a* controls the function unit in the sleep state to the active state. Specifically, the sleep control unit 26*a* controls the function unit in the sleep state to the active state only for a fixed time.

Figure 3:
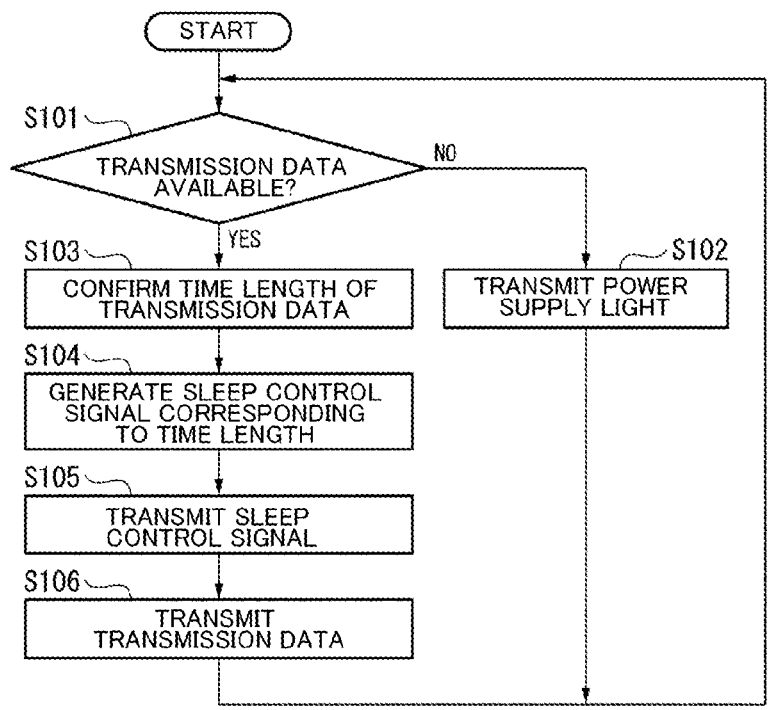
FIG. 3 is a flowchart illustrating a flow of processing of a power receiving optical communication device according to the first embodiment.
Figure 8:
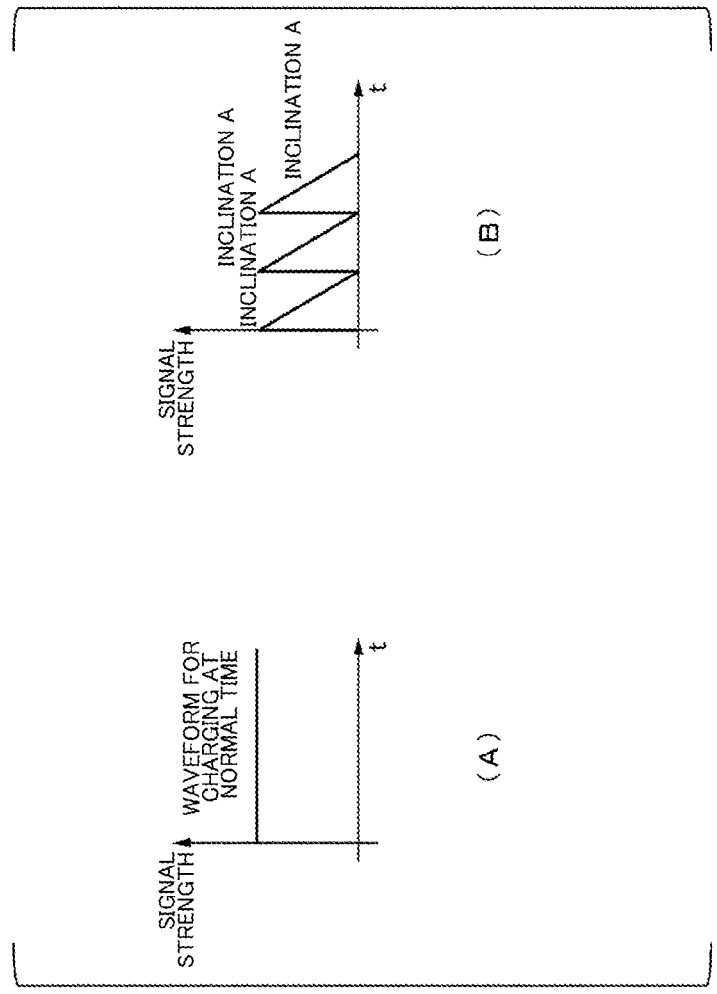
FIG. 8 is a flowchart illustrating the flow of processing of a power supply optical communication device 10*a* according to the second embodiment.

FIG. 8 is a flowchart illustrating a flow of processing of the power supply optical communication device 10*a* according to the second embodiment. In FIG. 8, processing similar to that in FIG. 3 is designated by the same reference signs as in FIG. 3, and will not be described.

If there is transmission data as a result of the process of step S101 (step S101—YES), the control unit 13*a* controls the optical power supply unit 12*a* to generate a sleep control signal having a highly noise resistance shape. The optical power supply unit 12*a* generates a sleep control signal under the control of the control unit 13*a* (step S301).

A method of generating a sleep control signal in the second embodiment will be described.

First, a first method of generating a sleep control signal in the second embodiment will be described. In the first method of generating the sleep control signal in the second embodiment, a case where an M-sequence signal is used will be described.

The optical power supply unit 12*a* generates an M-sequence sleep control signal having a predetermined 2(n−1) period (n is the number of unit times of the M-sequence and an integer equal to or greater than 2). Since the M-sequence has a feature that a high peak occurs in autocorrelation, the power receiving optical communication device 20*a* easily determines that the sleep control signal has arrived only when the correlation value becomes equal to or more than a threshold.

Figure 9:
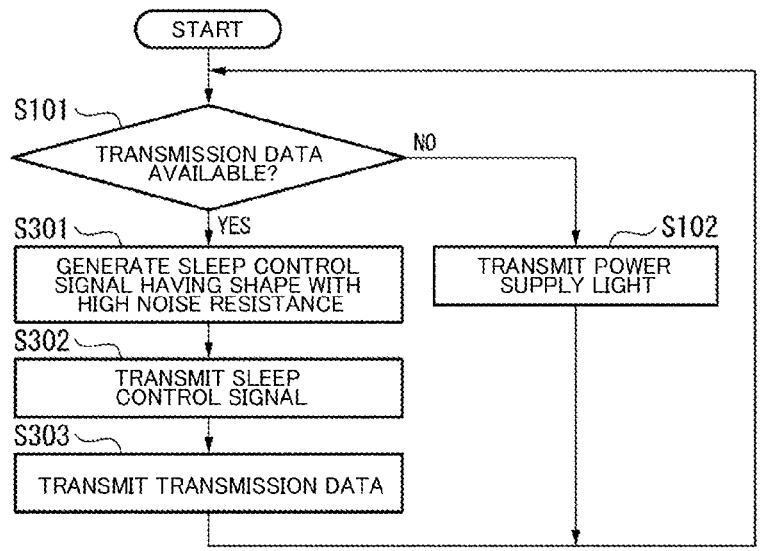
FIG. 9 is a diagram for describing second generation method of sleep control signal in the second embodiment.

Next, FIG. 9 is used to explain the second method of generating the sleep control signal in the second embodiment. FIG. 9(A) shows the waveform of the communication light when there is no transmission data, and FIG. 9(B) shows the waveform of the sleep control signal when there is transmission data. The optical power supply unit 12*a* generates a signal obtained by repeating a predetermined waveform between the power supply optical communication device 10*a* and the power receiving optical communication device 20*a* by a predetermined number of times as a sleep control signal. Here, it is desirable that the waveform of the sleep control signal can be easily extracted by the power receiving optical communication device 20*a*. For example, a waveform whose slope is always a as shown in FIG. 9(B) is desirable. The larger the number of times of repetition of the predetermined waveform is, the lower the probability of erroneous determination is, but if the number of times is too large, the lower the charging efficiency is caused.

The optical power supply unit 12a transmits the generated sleep control signal to the power receiving optical communication device 20a (step S302). Specifically, the optical power supply unit 12a transmits a sleep control signal to the power receiving optical communication device 20a via a power supply line. After the sleep control signal is transmitted, the control unit 13a controls the data transmission/reception unit 11 to transmit transmission data. The control unit 13a outputs data of an electric signal generated from the transmission data to a data transmission/reception unit 11.

A data transmission/reception unit 11 generates communication light on the basis of the electric signal of the transmission data output from the control unit 13a. The data transmission/reception unit 11 outputs the generated communication light to the optical transmission line 30 (step S303). After that, the process returns to step S101.

Figure 10:
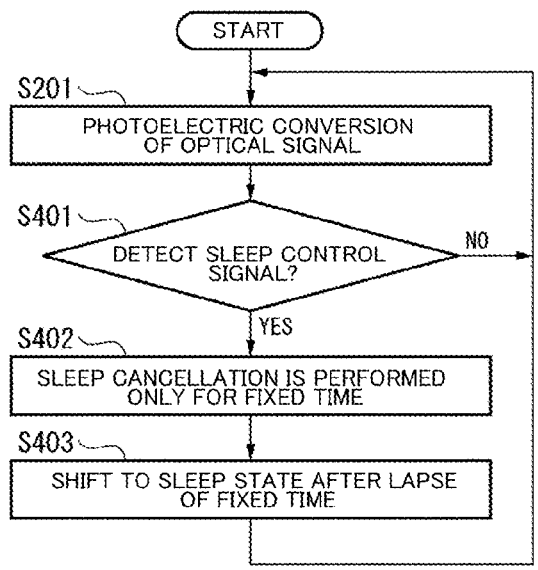
FIG. 10 is a flowchart illustrating a flow of processing of a power receiving optical communication device according to the second embodiment.

FIG. 10 is a flowchart illustrating a flow of processing of the power receiving optical communication device 20a according to the second embodiment. In the flowchart shown in FIG. 10, the processing of the optical signal received by the photoelectric conversion unit 22 will be mainly described. In FIG. 10, processing similar to that in FIG. 6 will be designated by the same reference signs as in FIG. 6, and will not be described.

The electric signal photoelectrically converted by the photoelectric conversion unit 22 by the processing of the step S201 is inputted to a power storage unit 23 and a signal detection unit 24a. The power storage unit 23 performs charging processing on the basis of the electric signal output from the photoelectric conversion unit 22. A signal detection unit 24a always monitors the electric signal outputted from the photoelectric conversion unit 22. In this way, the power receiving optical communication device 20 monitors electrical signals while constantly charging the battery. A signal detection unit 24a determines whether the sleep control signal is detected or not (step S401).

When the waveform of the electric signal outputted from the photoelectric conversion unit 22 is the waveform of the sleep control signal, the signal detection unit 24a determines that the sleep control signal is detected. For example, when an M-sequence sleep control signal is transmitted from the power supply optical communication device 10 a, the signal detection unit 24a calculates the autocorrelation of the electric signal. The signal detection unit 24a determines that the sleep control signal is detected when the value of the correlation value is equal to or more than a threshold. The signal detection unit 24a determines that the sleep control signal is not detected when the value of the correlation value is less than the threshold. When the signal detection unit 24a does not detect the sleep control signal (step S401—NO), the signal detection unit 24a does not perform processing in particular. After that, the process returns to step S201.

When the signal detection unit 24a detects the sleep control signal (step S401—YES), the signal detection unit 24a outputs a notification indicating that the sleep control signal is detected to the sleep control unit 26a. When receiving the notification from the signal detection unit 24a, the sleep control unit 26a controls the power storage unit 23 to supply power for a fixed time. The power storage unit 23 supplies power to the photoelectric conversion unit 21 and the wireless chip 27 only for a designated sleep cancellation time according to the control of the sleep control unit 26a to cancel the sleep of the photoelectric conversion unit 21 and the wireless chip 27 (step S402).

When power is supplied from the power storage unit 23, the photoelectric conversion unit 21 and the wireless chip 27 are started from a sleep state. After the transmission of the sleep control signal, communication light is transmitted from the power supply optical communication device 10a. Then, the photoelectric conversion unit 21 receives the communication light transmitted from the power supply optical communication device 10a via a communication line. The photoelectric conversion unit 21 converts the received communication light into an electrical signal of transmission data. The photoelectric conversion unit 21 outputs an electric signal of the transmission data to a wireless chip 27. The wireless chip 27 up-converts the input electric signal and transmits it to an external wireless device as a radio signal.

The sleep control unit 26a controls the power storage unit 23 to stop the supply of power to the photoelectric conversion unit 21 and the wireless chip 27 after the lapse of a fixed time. The power storage unit 23 stops power supply to the photoelectric conversion unit 21 and the wireless chip 27 according to control of the sleep control unit 26a, and thereby shifts the photoelectric conversion unit 21 and the wireless chip 27 to a sleep state (step S403). When the supply of power from the power storage unit 23 is stopped, the photoelectric conversion unit 21 and the wireless chip 27 are shifted from an active state to a sleep state. Thereafter, processing is executed from step S201.

According to the optical power supply system 100a configured as described above, the power supply optical communication device 10a transmits a sleep control signal having a shape with high noise resistance to the power receiving optical communication device 20a. Thus, erroneous determination of sleep control signal detection in the power receiving optical communication device 20a can be reduced. Thus, power consumption of the power receiving optical communication device 20a due to erroneous determination can be suppressed.

A modification of the optical power supply system 100a according to the second embodiment will be described.

The second embodiment may be configured in combination with the first embodiment. In the case of such a configuration, the power supply optical communication device 10a performs conversion by M-sequence or error correction code when transmitting information on the time length of transmission data via a power supply line to improve erroneous detection resistance and transmits the transmission data. The power receiving optical communication device 20a detects the sleep control signal by the method shown in the second embodiment, and cancels the photoelectric conversion unit 21 and the wireless chip 27 from sleep only for a sleep cancellation time corresponding to the sleep control signal. In this case, the power receiving optical communication device 20a is configured to include a sleep control information storage unit 25.

Third Embodiment

In the first embodiment, the case where the transmission speed is the same between the optical communication section and the wireless communication section has been described as an example. In the third embodiment, the configuration in the case where the transmission speed is different between the optical communication section and the wireless communication section will be described. For example, in the third embodiment, it is assumed that the transmission speed of the optical communication section is 1 Gbps (Giga bit per sec), and the transmission speed of the wireless communication section is 100 Mbps.

Figure 11:
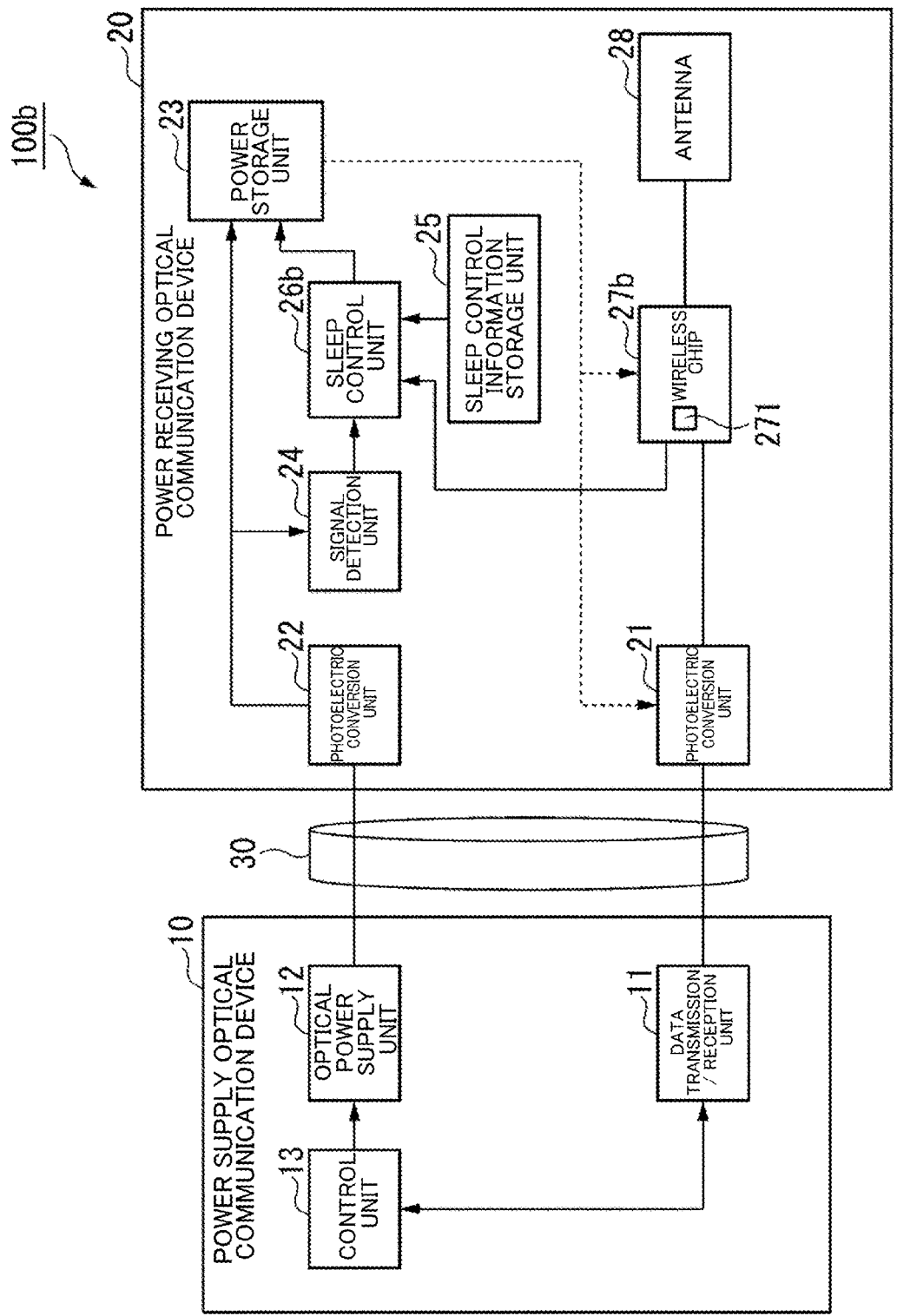
FIG. 11 is a diagram illustrating a configuration example of an optical power supply system according to a third embodiment.

FIG. 11 is a diagram showing a configuration example of an optical power supply system 100b according to the third embodiment.

The optical power supply system 100b includes a power supply optical communication device 10 and a power receiving optical communication device 20b. The power supply optical communication device 10 and the power receiving optical communication device 20b are connected via an optical transmission line 30. By connecting the power supply optical communication device 10 and the power receiving optical communication device 20b via the optical transmission line 30, communication between the power supply optical communication device 10 and the power receiving optical communication device 20b becomes possible. For example, the power supply optical communication device 10 and the power receiving optical communication device 20b are connected via a power supply line and a communication line, respectively. In FIG. 11, the power supply optical communication device 10 and the power receiving optical communication device 20b have a single-star type topology configuration.

Although one power receiving optical communication device 20b is shown in FIG. 11, the optical power supply system 100b may include a plurality of power receiving optical communication devices 20b. When a plurality of power receiving optical communication devices 20b are provided in the optical power supply system 100b, an optical splitter is provided between the power supply optical communication device 10 and the plurality of power receiving optical communication devices 20b. The optical splitter branches the optical signal transmitted from the power supply optical communication device 10 and transmits it to each power receiving optical communication device 20b. The optical splitter multiplexes the optical signals transmitted from each power receiving optical communication device 20b and transmits them to the power supply optical communication device 10.

In a third embodiment, the power receiving optical communication device 20b starts the photoelectric conversion unit 21 and the wireless chip 27b at the same timing. Thereafter, the power receiving optical communication device 20b makes the photoelectric conversion unit 21 sleep after the lapse of a time specified by at least the shape of the sleep control signal. The power receiving optical communication device 20b makes the wireless chip 27b sleep when a signal indicating the end of transmission processing of transmission data is obtained from the wireless chip 27b. Thus, in the third embodiment, even if the photoelectric conversion unit 21 and the wireless chip 27b are started at the same timing, the photoelectric conversion unit 21 is first put in the sleep state, and the wireless chip 27b is put in the sleep state with a delay.

The third embodiment differs from the first embodiment in the configuration of the power receiving optical communication device 20b. Differences from the first embodiment will be described below.

The power receiving optical communication device 20b is driven by power supplied from the power supply optical communication device 10b. The power receiving optical communication device 20b includes a photoelectric conversion unit 21, a photoelectric conversion unit 22, a power storage unit 23, a signal detection unit 24, A sleep control information storage unit 25, a sleep control unit 26b, a wireless chip 27b, and an antenna 28. The photoelectric conversion unit 21 and the wireless chip 27b are in a sleep state when they are not used.

The power receiving optical communication device 20b differs in configuration from the power receiving optical communication device 20 in that it includes a sleep control unit 26b and a wireless chip 27b instead of the sleep control unit 26 and the wireless chip 27. The power receiving optical communication device 20b is similar to the power receiving optical communication device 20 about other configurations. Therefore, the description of the entire power receiving optical communication device 20b will be omitted, and the sleep control unit 26b and the wireless chip 27b will be described.

A sleep control unit 26b refers to the information stored in the sleep control information storage unit 25, and controls the function unit in the sleep state to the active state according to the sleep control signal detected by the signal detection unit 24. Specifically, the sleep control unit 26b controls the function unit in the sleep state to the active state by at least the time specified by the shape of the sleep control signal.

The wireless chip 27b is a functional unit operable by power supplied from the power storage unit 23. The wireless chip 27b performs the same processing as the wireless chip 27. The wireless chip 27b is different from the wireless chip 27 in that a buffer 271 is provided inside. A buffer 271 temporarily stores the electric signal of the transmission data output from the photoelectric conversion unit 21. This is because the transmission rate of the wireless communication section is lower than that of the optical communication section, and therefore it is necessary to temporarily store the electric signal of the transmission data. The wireless chip 27b transmits the transmission data stored in the buffer 271 to an external wireless device via an antenna 28. The wireless chip 27b outputs a signal indicating the end of the transmission processing of the transmission data to a sleep control unit 26b after the transmission processing of the transmission data is completed.

Figure 12:
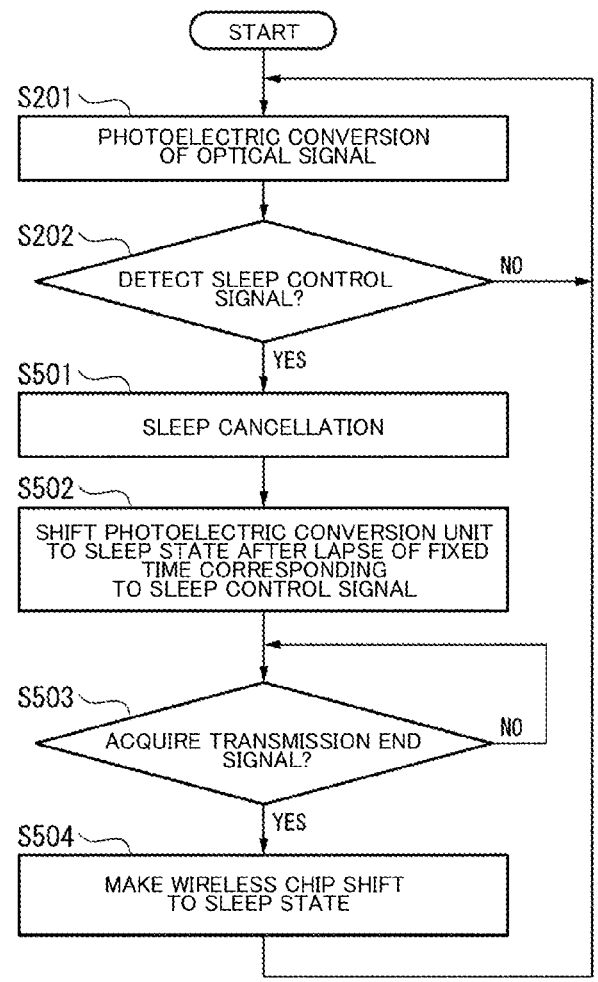
FIG. 12 is a flowchart illustrating a flow of processing of a power receiving optical communication device according to the third embodiment.

FIG. 12 is a flow chart showing the flow of processing of the power receiving optical communication device 20b in the third embodiment. In the flowchart shown in FIG. 12, the processing of the optical signal received by the photoelectric conversion unit 22 will be mainly described. In FIG. 12, processing similar to that in FIG. 6 will be designated by the same reference signs as in FIG. 6, and will not be described. If the signal detection unit 24 detects the sleep control signal (step S202—YES), the signal detection unit 24 outputs a notification indicating that the sleep control signal has been detected and the detected sleep control signal to the sleep control unit 26b. A sleep control unit 26b refers to the information stored in the sleep control information storage unit 25, and acquires information on sleep cancellation time corresponding to the sleep control signal output from the signal detection unit 24. For example, the sleep control unit 26b collates the waveform pattern stored in the sleep control information storage unit 25 with the waveform pattern of the sleep control signal output from the signal detection unit 24. Then, the sleep control unit 26b acquires information on sleep cancellation time associated with a waveform pattern matching the waveform pattern of the sleep control signal output from the signal detection unit 24.

A sleep control unit 26b controls the power storage unit 23 to supply power only for the acquired sleep cancellation time. The power storage unit 23 supplies power to the photoelectric conversion unit 21 and the wireless chip 27b only for a designated sleep cancellation time according to the control of the sleep control unit 26b to cancel the sleep of the photoelectric conversion unit 21 and the wireless chip 27b (step S501).

When power is supplied from the power storage unit 23, the photoelectric conversion unit 21 and the wireless chip 27b are started from a sleep state. After transmission of the sleep control signal, communication light is transmitted from the power supply optical communication device 10. Therefore, the photoelectric conversion unit 21 receives the communication light transmitted from the power supply optical communication device 10 via a communication line. The photoelectric conversion unit 21 converts the received communication light into an electrical signal of transmission data. The photoelectric conversion unit 21 outputs an electric signal of the transmission data to a wireless chip 27b. The wireless chip 27b temporarily stores the input electric signal in a buffer 271.

After the lapse of the sleep cancellation time, the sleep control unit 26b controls the power storage unit 23 to stop the supply of power to the photoelectric conversion unit 21. The power storage unit 23 stops the supply of power to the photoelectric conversion unit 21 according to the control of the sleep control unit 26 b to shift the photoelectric conversion unit 21 to a sleep state (step S502). When the supply of power from the power storage unit 23 is stopped, the photoelectric conversion unit 21 shifts from the active state to the sleep state.

The wireless chip 27b transmits the transmission data stored in the buffer 271 to an external wireless device via an antenna 28 (step S503). The wireless chip 27b outputs a notification indicating completion of transmission processing of the transmission data to a sleep control unit 26b. The sleep control unit 26b controls the power storage unit 23 with the reception of the notification from the wireless chip 27b as a trigger to stop the supply of power to the wireless chip 27b. The power storage unit 23 stops the supply of power to the wireless chip 27b according to the control of the sleep control unit 26b to shift the wireless chip 27b to a sleep state (step S504). When the supply of power from the power storage unit 23 is stopped, the wireless chip 27b is shifted from the active state to the sleep state. Thereafter, processing is executed from step S201.

According to the optical power supply system 100b configured as described above, the same effects as those of the first embodiment can be obtained.

In the optical power supply system 100b, a photoelectric conversion unit 21 for performing processing in an optical communication section is made to sleep first, and a wireless chip 27b for performing processing in a wireless communication section is made to sleep after the photoelectric conversion unit 21. As a result, when the transmission speed of the optical communication section is 10 times the transmission speed of the wireless communication section including the wireless chip 27b as in this example, the optical communication section can sleep 10 times more than the wireless communication section. Therefore, power consumption can be reduced.

The following describes a variation of the optical power supply system 100b in the third embodiment.

The power supply optical communication device 10 may be configured to continuously transmit the same sleep control signal to the power receiving optical communication device 20b.

The optical power supply system 100, 100a, 100b in the first to third embodiments are not limited to PON (Passive Optical Network), but may be applied to any system as long as the optical power supply system is used.

In the second embodiment, when the transmission rates are different between the optical communication section and the wireless communication section, the photoelectric conversion unit 21 and the wireless chip 27 may be made to sleep at different timings as shown in the third embodiment. In this configuration, the wireless chip 27 of the power receiving optical communication device 20a has the same configuration as 27b in the third embodiment. Specific processing is as follows.

The power receiving optical communication device 20a starts the photoelectric conversion unit 21 and the wireless chip 27 at the same timing. Thereafter, the power receiving optical communication device 20a makes the photoelectric conversion unit 21 sleep after at least a fixed time elapse. The power receiving optical communication device 20a makes the wireless chip 27 sleep when a signal indicating the end of transmission processing of transmission data is obtained from the wireless chip 27.

Some of the functional units included in the power supply optical communication devices 10, 10a and the power receiving optical communication devices 20, 20a, 20b in the above-described embodiments may be realized by a computer. In such a case, the program to realize their functions may be recorded on a computer-readable recording medium, and the program recorded on the recording medium may be read and executed by the computer system. It is assumed that the "computer system" mentioned here include an OS and hardware such as peripheral devices. Further, the "computer-readable recording medium" represents a transportable medium such as a flexible disk, a magneto-optical disk, a ROM, and a CD-ROM, as well as a storage device such as a hard disk embedded in the computer system. In addition, the "computer-readable recording medium" may also include a recording medium that dynamically retains a program for a short period of time, for example, a communication line used to transmit the program via a network (e.g., internet) or other communication lines (e.g., telephone line); and a recording medium that retains the program for a certain period of time, for example, a server or a volatile memory installed within the computer system that serves as a client in that case. Moreover, the program described above may be any of a program for realizing some of the functions described above, a program capable of realizing the functions described above in combination with a program already recorded in a computer system, and a program for realizing the functions using a programmable logic device such as an FPGA (Field Programmable Gate Array).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention can be applied to an optical communication system that performs optical power supply.

REFERENCE SIGNS LIST 10, 10a Feeding optical communication device
20, 20a 20b Power receiving optical communication device
11 Data transmission/reception unit
12 12a Optical power supply unit
13 13a Control unit 21 Photoelectric conversion unit
22 Photoelectric conversion unit
23 Power storage unit
24, 24a Signal detection unit
Sleep control information storage unit
26, 26a, 26b Sleep control unit
27, 27b Wireless chip
271 Buffer
28 Antenna

The invention claimed is:

1. An optical power supply system, comprising:
a power supply optical communication device configured to supply power using an optical signal for power supply; and a power receiving optical communication device that is driven by power obtained from the optical signal for power supply transmitted from the power supply optical communication device, wherein:
the power supply optical communication device is configured to:
transmit the optical signal for power supply to the power receiving optical communication device, when there is data to be transmitted to the power receiving optical communication device,
transmit a sleep control signal having a shape corresponding to a time length of the data or having a shape with high noise resistance, to cancel a sleep state of at least one function unit of the power receiving optical communication device, to the power receiving optical communication device, and
the power receiving optical communication device is configured to:
detect the sleep control signal transmitted from the power supply optical communication device,
control a functional unit in the sleep state to an active state according to the detected sleep control signal,
start a function unit for processing the optical signal and a function unit for processing an electric signal at a same timing when a transmission speed in an optical communication section between the power supply optical communication device and the power receiving optical communication device is faster than a transmission speed in a wireless communication section between the power receiving optical communication device and an external wireless device,
control the function unit for processing the optical signal to enter the sleep state after a predetermined time period according to reception of the sleep control signal, and
control the functional unit for processing the electrical signal to enter the sleep state, when a signal indicating an end of data transmission is obtained from the functional unit for processing the electrical signal.

2. The optical power supply system according to claim 1, wherein the power receiving optical communication device is configured to determine the signal as the sleep control signal when a temporal change in a waveform of the signal transmitted from the power supply optical communication device is equal to or greater than a threshold, and
the power receiving optical communication device is configured to control the functional unit to change the sleep state to the active state at least for a time period specified by the shape of the sleep control signal.

3. The optical power supply system according to claim 1, wherein:
the power supply optical communication device is configured to continuously transmit the sleep control signal having a same waveform to the power receiving optical communication device,
the power receiving optical communication device is configured to detect a temporal change in a waveform of a signal transmitted from the power supply optical communication device, and determine the signal as the sleep control signal when the same waveform is detected a plurality of times, and
the power receiving optical communication device is configured to control the function unit to change the sleep state to the active state for a time period obtained by adding a time for absorbing transmission delay occurring between the power supply optical communication device and the power receiving optical communication device, or a timing deviation caused by signal processing occurring, to a time specified by the shape of the sleep control signal.

4. The optical power supply system according to claim 1, wherein:
the power receiving optical communication device is configured to determine the signal transmitted from the power supply optical communication device as the sleep control signal, based on an autocorrelation value of the signal being above a first threshold value, or a repetition of the same waveform being detected in the signal, or a temporal change of the signal after decoding being above a second threshold value, and
the power receiving optical communication device is configured to control the functional unit to change the sleep state to the active state for the predetermined time period in response to the sleep control signal.

5. The optical power supply system according to claim 1, wherein
when a transmission rate in the optical communication section between the power supply optical communication device and the power receiving optical communication device are the same as a transmission rate in the wireless communication section between the power receiving optical communication device and the external wireless device, the power receiving optical communication device is configured to perform sleep control of the function unit for processing the optical signal and the function unit for processing the electric signal at the same timing.

6. A sleep control method, comprising:
transmitting, by a power supply optical communication device, an optical signal for power supply to a power receiving optical communication device, when there is data to be transmitted to the power receiving optical communication device, wherein the power supply optical communication device is configured to supply power using the optical signal for power supply; and the power receiving optical communication device is driven by power obtained from the optical signal for power supply transmitted from the power supply optical communication device,
transmitting, by the power supply optical communication device, a sleep control signal having a shape corresponding to a time length of the data or having a shape with high noise resistance, to cancel a sleep state of at least one function unit of the power receiving optical communication device, to the power receiving optical communication device, and detecting, by the power receiving optical communication device, the sleep control signal transmitted from the power supply optical communication device, controlling, by the power receiving optical communication device, a functional unit in the sleep state to an active state according to the detected sleep control signal, starting a function unit for processing the optical signal and a function unit for processing an electric signal at a same timing when a transmission speed in an optical communication section between the power supply optical communication device and the power receiving optical communication device is faster than a transmission speed in a wireless communication section between the power receiving optical communication device and an external wireless device, controlling the function unit for processing the optical signal to enter the sleep state after a predetermined time period according to reception of the sleep control signal, and controlling the functional unit for processing the electrical signal to enter the sleep state, when a signal indicating an end of data transmission is obtained from the functional unit for processing the electrical signal.

7. The sleep control method according to claim 6, comprising:

determining, by the power receiving optical communication device, the signal as the sleep control signal based on a temporal change in a waveform of the signal transmitted from the power supply optical communication device being equal to or greater than a threshold, and controlling, by the power receiving optical communication device, the functional unit to change the sleep state to the active state at least for a time period specified by the shape of the sleep control signal.

8. The sleep control method according to claim 6, comprising:

continuously transmitting, by the power supply optical communication device, the sleep control signal having a same waveform to the power receiving optical communication device, detecting, by the power receiving optical communication device, a temporal change in a waveform of a signal transmitted from the power supply optical communication device, and determining the signal as the sleep control signal when the same waveform is detected a plurality of times, and controlling, by the power receiving optical communication device, the function unit to change the sleep state to the active state for a time period obtained by adding a time for absorbing transmission delay occurring between the power supply optical communication device and the power receiving optical communication device, or a timing deviation caused by signal processing occurring, to a time specified by the shape of the detected sleep control signal.

9. The sleep control method according to claim 6, comprising:

determining, by the power receiving optical communication device, the signal transmitted from the power supply optical communication device as the sleep control signal, based on an autocorrelation value of the signal being above a first threshold value, or a repetition of the same waveform being detected in the signal, or a temporal change of the signal after decoding being above a second threshold value, and controlling, by the power receiving optical communication device, the functional unit to change the sleep state to the active state for the predetermined time period in response to the sleep control signal.

10. The sleep control method according to claim 6, comprising:

when a transmission rate in the optical communication section between the power supply optical communication device and the power receiving optical communication device are the same as a transmission rate in the wireless communication section between the power receiving optical communication device and the external wireless device, performing, by the power receiving optical communication device, sleep control of the function unit for processing the optical signal and the function unit for processing the electric signal at the same timing.

11. A power receiving optical communication device, in an optical power supply system that includes a power supply optical communication device that supplies power using an optical signal for power supply, and the power receiving optical communication device that is driven by power obtained from the optical signal for power supply transmitted from the power supply optical communication device, the power receiving optical communication device is configured to:

detect a sleep control signal having a shape corresponding to a time length of data or having a shape with high noise resistance for canceling a sleep state of at least one function unit;

control a functional unit in the sleep state to an active state depending on the detected sleep control signal;

start a function unit for processing the optical signal and a function unit for processing an electric signal at a same timing when a transmission speed in an optical communication section between the power supply optical communication device and the power receiving optical communication device is faster than a transmission speed in a wireless communication section between the power receiving optical communication device and an external wireless device;

control the function unit for processing the optical signal to enter the sleep state after a predetermined time period according to reception of the sleep control signal; and control the functional unit for processing the electrical signal to enter the sleep state, when a signal indicating an end of data transmission is obtained from the functional unit for processing the electrical signal.

12. The power receiving optical communication device according to claim 11, configured to:

determine the signal as the sleep control signal based on a temporal change in a waveform of the signal transmitted from the power supply optical communication device being equal to or greater than a threshold, and control the functional unit to change the sleep state to the active state at least for a time period specified by the shape of the sleep control signal.

13. The power receiving optical communication device according to claim 11, wherein:

the power supply optical communication device is configured to continuously transmit the sleep control signal having a same waveform to the power receiving optical communication device, the power receiving optical communication device is configured to detect a temporal change in a waveform of a signal transmitted from the power supply optical communication device, and determine the signal as the sleep control signal when the same waveform is detected a plurality of times, and the power receiving optical communication device is configured to control the function unit to change the sleep state to the active state for a time period obtained by adding a time for absorbing transmission delay occurring between the power supply optical communication device and the power receiving optical communication device, or a timing deviation caused by signal processing occurring, to a time specified by the shape of the detected sleep control signal.

14. The power receiving optical communication device according to claim 11, configured to:

determine the signal transmitted from the power supply optical communication device as the sleep control signal, based on an autocorrelation value of the signal being above a first threshold value, or a repetition of the same waveform being detected in the signal, or a temporal change of the signal after decoding being above a second threshold value, and control the functional unit to change the sleep state to the active state for the predetermined time period in response to the sleep control signal.

15. The power receiving optical communication device according to claim 11, configured to:

when a transmission rate in the optical communication section between the power supply optical communication device and the power receiving optical communication device are the same as a transmission rate in the wireless communication section between the power receiving optical communication device and the external wireless device, perform sleep control of the function unit for processing the optical signal and the function unit for processing the electric signal at the same timing.

* * * * *